(12) United States Patent
Adams (10) Patent No.: US 10,908,727 B2
(45) Date of Patent: Feb. 2, 2021

(54) ELECTRONIC DEVICE INCLUDING TOUCHPAD AND FINGERPRINT SENSOR AND METHOD OF DETECTING TOUCH

(71) Applicant: BlackBerry Limited, Waterloo (CA)

(72) Inventor: Neil Patrick Adams, Waterloo (CA)

(73) Assignee: BlackBerry Limited, Waterloo (CA)

( * ) Notice: Subject to any disclaimer, the term of this patent is extended or adjusted under 35 U.S.C. 154(b) by 166 days.

(21) Appl. No.: 15/801,891

(22) Filed: Nov. 2, 2017

(65) Prior Publication Data

US 2019/0129559 A1    May 2, 2019

(51) Int. Cl.
*G06F 3/0488* (2013.01)
*G06F 3/041* (2006.01)
*G06F 3/044* (2006.01)
*G06F 21/32* (2013.01)
*G06K 9/00* (2006.01)
*G06F 9/445* (2018.01)

(52) U.S. Cl.
CPC ............ *G06F 3/0416* (2013.01); *G06F 3/044* (2013.01); *G06F 3/0488* (2013.01); *G06F 21/32* (2013.01); *G06K 9/00087* (2013.01); *G06F 9/445* (2013.01); *G06F 2203/0338* (2013.01)

(58) Field of Classification Search
None
See application file for complete search history.

(56) References Cited

U.S. PATENT DOCUMENTS

| 2002/0054695 A1* | 5/2002 | Bjorn | G06F 3/03547 382/124 |
| 2002/0122026 A1 | 9/2002 | Bergstrom et al. | |
| 2004/0179692 A1* | 9/2004 | Cheng | G06F 21/86 380/278 |
| 2006/0181511 A1 | 8/2006 | Woolley | |
| 2010/0027854 A1* | 2/2010 | Chatterjee | G06F 3/016 382/124 |

(Continued)

FOREIGN PATENT DOCUMENTS

| EP | 2778858 A1 | 9/2014 |
| EP | 3032385 A1 | 6/2016 |

(Continued)

OTHER PUBLICATIONS

European Patent Application No. 18202144.4, Extended European Search Report dated Feb. 13, 2019.

(Continued)

*Primary Examiner* — Parul H Gupta
(74) *Attorney, Agent, or Firm* — Borden Ladner Gervais LLP; Todd Keeler (57) ABSTRACT

A method for controlling an electronic device having a first touch sensor array and a fingerprint sensor includes receiving a first touch at the fingerprint sensor, in a fingerprint sensing mode: receiving first touch data associated with the first touch to a fingerprint controller, and authenticating a user based on the first touch data, and in a touch sensing mode: transmitting the first touch data associated with the first touch to a second controller, wherein the fingerprint sensor and the first touch sensor array form a combined touchpad in the touch sensing mode, and determining a touch location on the combined touchpad based on the first touch data.

15 Claims, 4 Drawing Sheets

(56) References Cited

U.S. PATENT DOCUMENTS

| | | | |
|---|---|---|---|
| 2010/0246902 A1* | 9/2010 | Rowe | G06K 9/00033 382/115 |
| 2011/0032206 A1* | 2/2011 | Kitamura | G06T 1/0021 345/173 |
| 2011/0273267 A1 | 11/2011 | Bong et al. | |
| 2011/0317886 A1* | 12/2011 | Matsuoka | G06K 9/00026 382/124 |
| 2012/0105081 A1 | 5/2012 | Shaikh et al. | |
| 2013/0161172 A1 | 6/2013 | Leong et al. | |
| 2014/0270413 A1* | 9/2014 | Slaby | G06F 3/0488 382/124 |
| 2014/0333328 A1 | 11/2014 | Nelson et al. | |
| 2015/0185954 A1* | 7/2015 | Chang | G06F 3/0416 345/173 |
| 2015/0234507 A1* | 8/2015 | Chun | G06F 1/1616 345/173 |
| 2015/0363034 A1* | 12/2015 | Hinckley | G06F 3/04883 345/173 |
| 2017/0118642 A1* | 4/2017 | Fukui | H04L 63/083 |
| 2017/0220182 A1* | 8/2017 | Schwartz | G06F 3/0416 |
| 2018/0144111 A1* | 5/2018 | Katingari | G06F 3/0488 |
| 2018/0365477 A1 | 12/2018 | Seol et al. | |

FOREIGN PATENT DOCUMENTS

| | | |
|---|---|---|
| JP | 2008009616 A | 1/2008 |
| WO | 2015126317 A1 | 8/2015 |
| WO | 2017073811 A1 | 5/2017 |
| WO | 2017112714 A1 | 6/2017 |

OTHER PUBLICATIONS

European Patent Application No. 18202144.4, Office Action dated Apr. 24, 2020.

* cited by examiner

ELECTRONIC DEVICE INCLUDING TOUCHPAD AND FINGERPRINT SENSOR AND METHOD OF DETECTING TOUCH

FIELD OF TECHNOLOGY

The present disclosure relates to detecting touch on a fingerprint sensor of an electronic device.

BACKGROUND

Electronic devices, have gained widespread use and may provide a variety of functions including, for example, telephonic, electronic messaging and other personal information manager (PIM) application functions. Electronic devices include several types of devices including mobile stations such as simple cellular telephones, smart telephones, wireless PDAs, and computers.

Such electronic devices often include a touchpad that may be utilized to detect touch gestures and a fingerprint sensor that may be utilized to authenticate a user of the electronic device. In some situations, the fingerprint sensor is located in close proximity to, and in some cases partially surrounded by, the touch pad.

Improvements in detecting touches on an electric device are desired.

BRIEF DESCRIPTION OF THE DRAWINGS

Embodiments of the present disclosure will now be described, by way of example only, with reference to the attached figures, in which.

DETAILED DESCRIPTION

The following describes an electronic device including a touch sensor array and a fingerprint sensor and a method of detecting a touch on the fingerprint sensor. The method includes receiving a first touch at the fingerprint sensor, in a fingerprint sensing mode: receiving first touch data associated with the first touch to a fingerprint controller, and authenticating a user based on the first touch data, and in a touch sensing mode: transmitting the first touch data associated with the first touch to a second controller, wherein the fingerprint sensor and the first touch sensor array form a combined touchpad in the touch sensing mode, and determining a touch location on the combined touchpad based on the first touch data.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device. Examples of electronic devices include mobile, or handheld, wireless communication devices such as cellular phones, cellular smart-phones, wireless organizers, personal digital assistants, computers, tablet computers, mobile internet devices, electronic navigation devices, and so forth.

Figure 1:
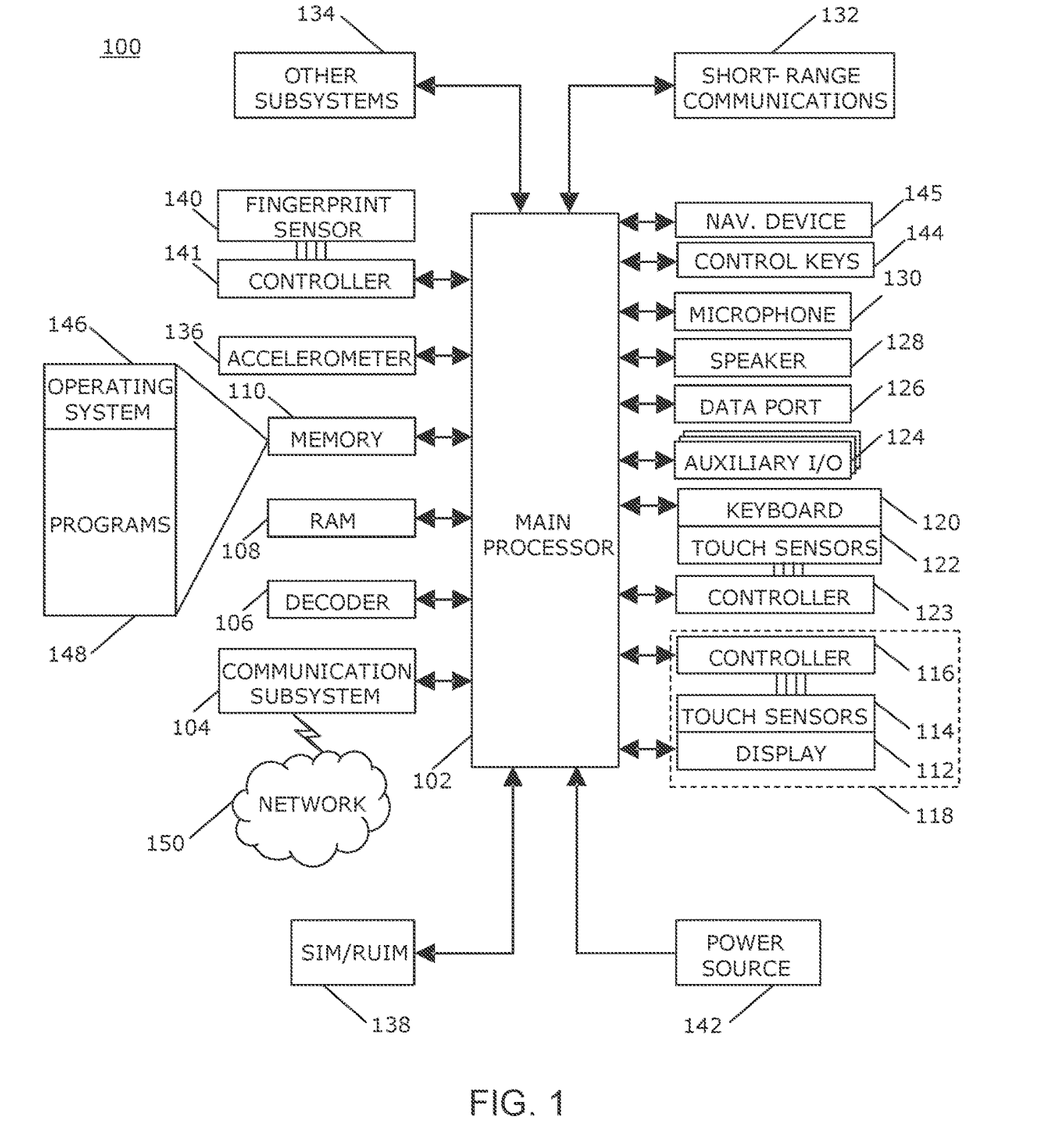
FIG. 1 is a block diagram of a portable electronic device in accordance with the present disclosure.

A block diagram of one example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for hands-free use.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. In addition, the keys of the keyboard include touch sensors 122 coupled to a controller 123 to detect touch input thereon. The controller may be a keyboard controller 123 as illustrated in FIG. 1. Alternatively, the keys of the keyboard 120 may be coupled to the controller 116 utilized to detect touches using the touch sensors 114 of the touch-sensitive display 118. In other examples, the keyboard controller 123 may comprise two separate controllers (not shown) such that the keys of the keyboard 120 are coupled to one controller to detect key presses, and the touch sensors 122 of the keyboard 120 are coupled to the other controller.

The processor 102 may also interact with a plurality of control keys 144 and a navigation device 145. The control keys 144 may include, for example, a send key, a menu key, an escape key, an end key, or any other suitable control keys. The navigation device 145 may be a touch-sensitive track pad, an optical joystick, or any other suitable navigation device to interface with a user to provide input. The navigation device 145 may be utilized, for example, to navigate or scroll through information on a display, control a cursor or other indicator, edit information, and so forth.

The processor 102 also interacts with a fingerprint sensor 140 for obtaining fingerprint data that is utilized to authenticate a user. The fingerprint sensor 140 may detect a touch thereon and obtain the fingerprint data upon receipt of a touch. The fingerprint sensor 140 is coupled to a fingerprint controller 141 that detects a touch on the fingerprint sensor 140, obtains the fingerprint data upon receipt of the touch, and may compare the obtained fingerprint data with stored fingerprint data to authenticate the user. For example, a user may be authenticated when the obtained fingerprint data from the user's touch matches or at least partially matches the stored fingerprint data that is associated with an authorized user. Authentication of the user may be utilized, for example, to unlock the electronic device 100, to access applications, documents, or information on the electronic device 100, or for any other suitable purpose.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO). The touch sensors 114 may be collectively referred to herein as a touch sensor 114 array or a touchpad 114.

One or more touches, also known as touch contacts or touch events, may be detected by the touch-sensitive display 118. The controller 116 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch sensors 122 on the keyboard may be any suitable touch sensors, such as capacitive touch-sensors and may comprise any suitable material, such as indium tin oxide (ITO). The touch sensors 122 may be collectively referred to herein as a touch sensor array 122 or a touchpad 122.

One or more touches on the keys of the keyboard 120 may be detected. The keyboard controller 123 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the keyboard 120. A touch may be detected from any suitable input member and multiple simultaneous touches may be detected.

One or more gestures may also be detected utilizing the touch sensors 122 disposed on the keyboard 120. A gesture on the keys of the keyboard 120 may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover.

The fingerprint sensor 140 may be any suitable sensor for obtaining an image of a fingerprint, such as capacitive touch-sensor and may comprise any suitable material, such as indium tin oxide (ITO). Alternatively, the fingerprint sensor 140 may be an optical sensor that optically obtains an image of the fingerprint. The fingerprint sensor 140 may be a stand-alone component, or may be incorporated into another component of the electronic device 100 such as, for example, a key of the keyboard 120 or the navigation device 145.

A touch may be detected on the fingerprint sensor 140. The fingerprint controller 141 may determine attributes of the touch, including an image of the touch, which may be referred to as fingerprint data, and the location of the touch. Touch location data may include data for an area of contact or data for a single point of contact, such as a point at or near a center of the area of contact. The location of a detected touch may include x and y components, e.g., horizontal and vertical components, respectively, with respect to one's view of the fingerprint sensor 140. A touch may be detected from any suitable input member and multiple simultaneous touches may be detected.

The resolution of the fingerprint sensor 140 may be higher than the resolution of the touch sensors 114 of the touch-sensitive display and of the touch sensors 122 of the keyboard 120. The higher resolution of the fingerprint sensor 140 facilitates obtaining a sufficient resolution of the image of the touch in order to detect the pattern of the user's fingerprint. For a fingerprint sensor 140 comprising a capacitive touch sensor, the higher resolution may be provided by increasing the density of drive and sense electrodes, i.e., increasing the density of nodes, compared to the density of nodes of the touch sensors 114 and the touch sensors 122.

As disclosed in more detail below, the fingerprint controller 141 may operate in a fingerprint sensing mode and a touch sensing mode. In the fingerprint mode, fingerprint data is obtained for the touch and is utilized to authenticate a user based on the touch. In the fingerprint sensing mode, the fingerprint controller 141 may signal to an application executed on the electronic device 100 that a user is authenticated or not, but, in some examples, does not transmit the fingerprint data itself.

In the touch sensing mode, the fingerprint sensor 141 transmits touch data associated with a touch on the fingerprint sensor such that the fingerprint sensor and another touch sensor array of the electronic device 100 may form a combined touchpad. For example, the fingerprint controller 141 generate touch location data for the touch may transmit the touch location data to another controller, such as the keyboard controller 123 or the display controller 116. Alternatively, in the touch sensing mode, an intermediate controller (not shown) may receive touch location data from the fingerprint controller 141 and one or both of the display controller 116 and the keyboard controller such that the intermediate controller is utilized to control the combined touchpad formed by the fingerprint sensor and one or both of the keyboard touch sensors 122 and the display touch sensors 114. Although not shown in FIG. 1, the fingerprint controller 141 may be directly coupled to one or both of the keyboard controller 123 and the display controller 116 to facilitate the fingerprint controller transmitting touch data.

The controllers 116, 123, 141 may be hardware devices, such as for example processors that are configured to perform one or more of detect touches on the associated touch sensor array, determine a location of the detected touch, and transmit touch data.

The touch-sensitive display 118 includes a display area in which information may be displayed, and may include a non-display area (not shown) extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

Figure 2A:
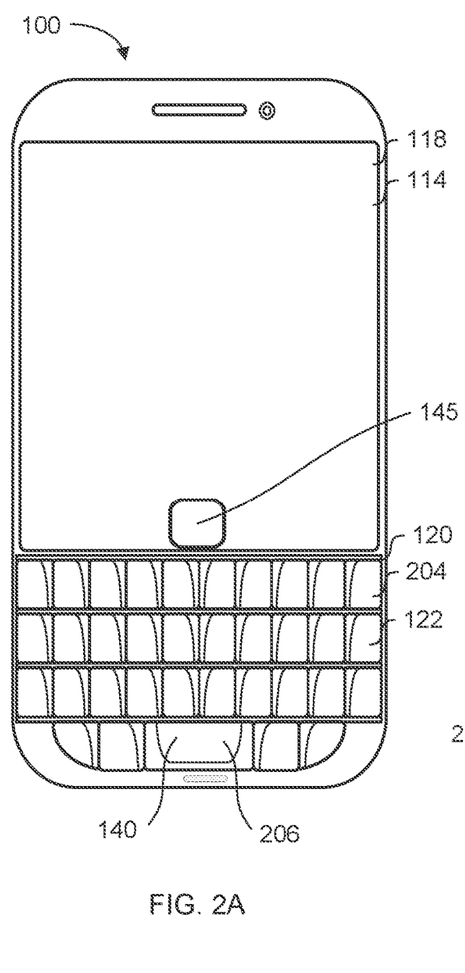
FIGS. 2A and 2B are front views of an example of an electronic device in accordance with the present disclosure.
Figure 2B:
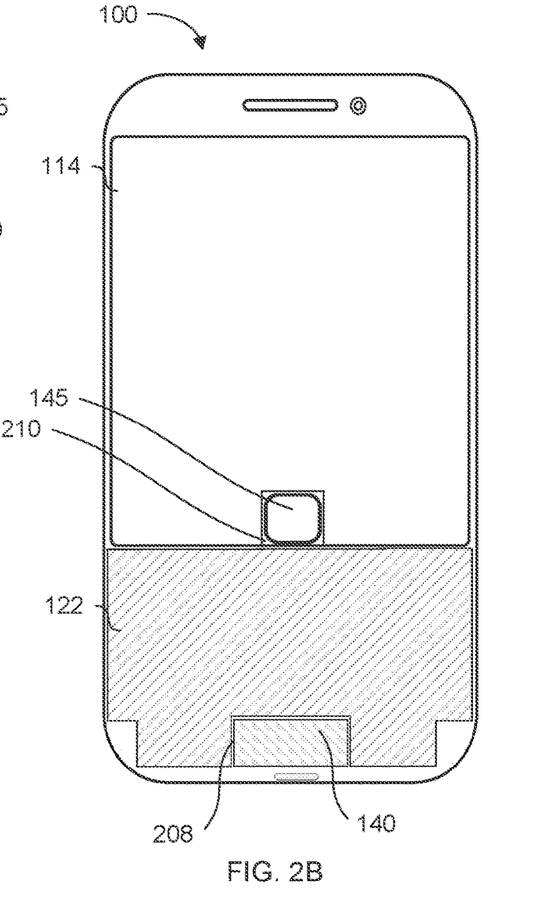

An example of an electronic device 100 including a touch-sensitive display 118 with touch sensor array 114, a mechanical keyboard 120 with touch sensor array 122, a fingerprint sensor 140, and a navigation device 145 is shown in FIGS. 2A and 2B.

The mechanical keyboard 120 includes a plurality of keys 204. Each one of the keys 204 of the keyboard 120 is associated with at least one character such that a character is entered utilizing a key 204. The keyboard 120 in the present example, includes four rows of keys 204 other numbers of rows of keys may be implemented, however.

The navigation device 145 is disposed above the mechanical keyboard 120. For the purpose of the present example, the navigation device 145 is an optical joystick for user input.

The keys 204 mechanical keyboard 120 includes a space bar 206. In the example shown, the fingerprint sensor 140 is located on the space bar 206. The touch sensor array 122 extends over the mechanical keyboard 120. In an example, the touch sensor array 122 may be located underneath the keys 204, but not underneath the space bar 206 such that the touch sensor array 122 has a gap around the space bar 206 as can be seen in FIG. 2B. The touch sensor array 122 may include openings (not shown) corresponding to each key 204 such that when a key 204 is pressed a portion of key 204 may activate a mechanical switch that is located underneath the touch sensor array 122. In this example, the touch sensors of the touch sensor array 122 are sufficiently sensitive such that a touch on the top surface of one of the keys 204 may be detected by the portions of the sensor that are located underneath the top surface. The location of the touch may be determined based on the signal that is received by the touch sensor so of the touch sensor array 122 that is located in each regions between the keys 204. In another example, the touch sensor array 122 may extend over the top surface of the keys 204.

FIG. 2B shows the example electronic device 100 without the keys 204 and the space bar 206 in order to illustrate the layout of the touch sensor array 122 and the fingerprint sensor 140. As can be seen in the example electronic device 100 shown in FIG. 2B, the touch sensor array 122 of the keyboard 120 includes a cutout 208 in which the fingerprint sensor 140 is located. In this example, it may be desirable, when the fingerprint sensor 140 is not being utilized to authenticate a user, that touches received at the fingerprint sensor 140 may be treated as if the fingerprint sensor 140 is part of the touch sensor array 122 such that the fingerprint sensor 140 and the touch sensor array 122 form a combined touchpad. As noted above, the touch sensor array 122 may be located beneath the keys 204 and may include openings (not shown) for the key 204 or a portion thereof to pass through the touch sensor array 122.

Alternatively, the fingerprint sensor 140 may be incorporated into the navigation sensor 145. In this case, the fingerprint sensor 140 is located within a cutout 210 in the touch sensor array 114 of the touch-sensitive display 118, i.e., the touch sensor array 114 has a gap around the navigation sensor 145. In this example, it may be desirable, when the fingerprint sensor 140 is not being utilized to authenticate a user, that touches received at the fingerprint sensor 140 may be treated as if the fingerprint sensor 140 is part of the touch sensor array 114 such that the touch sensors 114 and the fingerprint sensor 140 form a combined touchpad.

Figure 3:
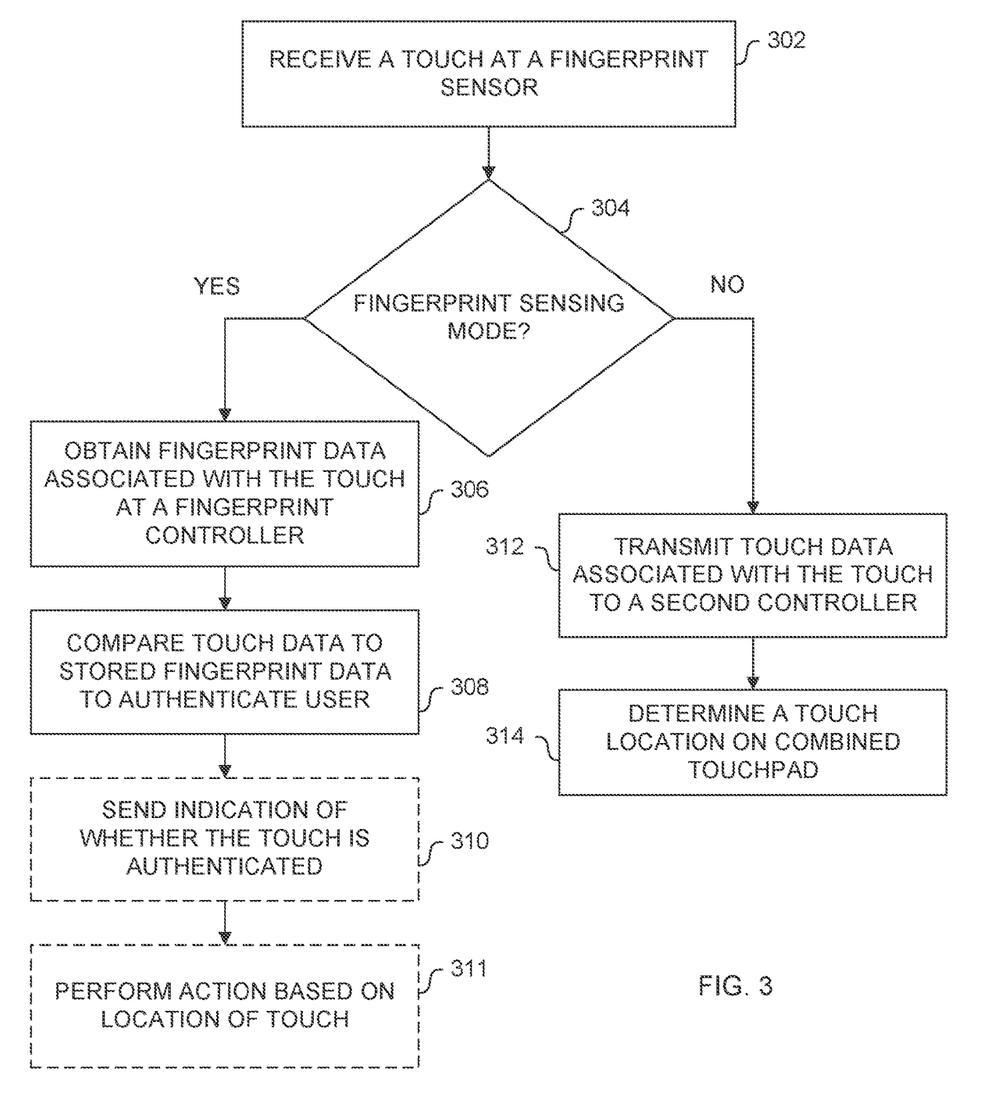
FIG. 3 is a flowchart illustrating a method of detecting a touch in accordance with the present disclosure.

A flowchart illustrating a method of forming a combined touchpad from a fingerprint sensor and at least one other touch sensor array of an electronic device, such as the portable electronic device 100, is shown in FIG. 3. The other touch sensor array may be the touch sensor array included in a touch-sensitive display, such as the touch sensor array 114, or the touch sensor array included in a keyboard, such as the touch sensor array 122. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor, such as the processor 102, of the portable electronic device to perform the method may be stored in a computer-readable storage medium, such as a non-transitory computer-readable medium.

At 302, a touch is received at a fingerprint sensor of an electronic device, such as the fingerprint sensor 140 of the electronic device 100.

At 304, a determination is made whether or not the electronic device is in a fingerprint sensing mode. In the fingerprint sensing mode, touches received at the fingerprint sensor are utilized to authenticate a user of the electronic device. A fingerprint sensing mode may be entered into in response to receiving a signal, or a trigger, from an application executed on the electronic device. The signal received from the application may indicate that authentication is desired and in response to the signal or trigger, the fingerprint sensing mode may be initiated if the electronic device is not already in the fingerprint sensing mode. Conversely, the signal or trigger received from the application may indicate that authentication is not needed and, in response to receiving this signal or trigger, the fingerprint sensing mode may be ended if the electronic device is in fingerprint sensing mode. The signal from the application may be received at, for example, a fingerprint controller, such as fingerprint controller 141.

When the determination at 304 is that the electronic device is in the fingerprint sensing mode, the process continues at 306. At 306, fingerprint data associated with the touch received at the fingerprint sensor is obtained by the fingerprint controller.

At 308, the fingerprint data is compared with stored fingerprint data to authenticate the user. Authentication may be confirmed when, for example, the obtained fingerprint data matches, or at least partially matches, the stored fingerprint data. The comparison at 308 may be performed by the fingerprint controller. Alternatively, the comparison at 308 may be performed by an application that requested the authentication. In this case, the obtained fingerprint data may be provided by the fingerprint controller to the application in order for the application to perform the comparison with stored fingerprint data.

If the comparison at 308 is performed by the fingerprint controller, then optionally, the fingerprint controller sends an indication to the application of whether or not the user is authenticated at 310. In response to receiving the indication at 308, the application may unlock some functionality that requires user authentication. Unlocking certain functionality may involve accessing a key in a keystore and performing a decrypt or sign operation on once authentication is performed. Advantageously, having the fingerprint controller perform the comparison at 308 and send only an indication of authentication to the application may increase security of the authentication process compared to the application performing the comparison. For example, applications may be denied access the obtained and stored fingerprint data when the fingerprint controller performs the comparison at 308. Denying access to fingerprint data by applications, which may be third party applications, may inhibit security breaches via those applications which may result in unauthorized persons having access to the fingerprint data. Further, sending only an indication of whether the user is authenticated, and not sending the fingerprint data, the amount of data passed between the fingerprint controller and the applications running on the electronic device 100 may be reduced, which may increase the efficiency and speed of the electronic device 100.

Optionally at 311, the location of the touch on the fingerprint sensor may be utilized to perform a particular action based on the touch location. For example, particular applications, or particular features, may be associated with locations of the fingerprint sensor. When a touch is received at a location associated with an application or a feature that application may be launched or that feature may be opened when the user is authenticated at 308. Performing the action may be performed when, for example, authentication is performed to unlock an electronic device when the electronic device is locked. The application that is launched may be, for example, a navigation application or an email application such that the electronic device opens from a lock screen into that application. The feature associated with a touch location may be, for example, turning on a flashlight feature of the electronic device. The action that is performed for touches at particular locations on the fingerprint sensor may be user configurable.

In an example, a touch on the left side of the fingerprint sensor may launch a first application or open a first feature when the user is authenticated and the electronic device unlocks, which a touch on the right side of the fingerprint sensor may launch a second, different application, or open a second, different feature, when the user is authenticated and the electronic device unlocks. A touch in the middle of the fingerprint sensor may, for example, unlock the electronic device without launching an application or opening a feature when the user is authenticated, or may launch a third different application or open a third different feature.

When the determination at 304 is that the electronic device 100 is not in the fingerprint sensing mode, the process continues at 312 and the touch data associated with the touch received at the fingerprint sensor is transmitted to a second controller. In an example, all touch data from touches at the fingerprint sensor is received at the fingerprint controller. When the electronic device 100 is not in the fingerprint sensing mode, the fingerprint controller transmits the touch data to the second controller. The mode when the electronic device is not in the fingerprint sensing mode may be referred to as a touch sensing mode. The touch sensing mode refers to touches received at the fingerprint sensor being used as touches on a combined touchpad formed by the fingerprint sensor and at least one other touch sensor array.

The second controller may be a touch sensor controller, such as display controller 116 or keyboard controller 123.

For example, in the example shown in FIGS. 2A and 2B in which the fingerprint sensor 140 and the touch sensor array 122 of the keyboard 120 form a combined touchpad, the touch data may be sent to the keyboard controller 123. As described above, the keyboard controller 123 shown in FIG. 1 may be two separate controllers and, in this case, the touch data is sent to the controller that controls the touch sensor array 122. Alternatively, if the fingerprint sensor 140 and the touch sensor array 114 of the touch-sensitive display 118 form the combined touchpad, then the touch data associated with the touch on the fingerprint sensor 140 may be transmitted to the controller 116 of the touch-sensitive display.

Alternatively, in the touch sensing mode, the second controller may be an intermediate controller (not shown in FIG. 1) that is different from the respective controllers utilized to determined touches on the fingerprint sensor and the touch sensor array when the device is not in the fingerprint sensing mode. For example, referring to FIGS. 1 through 2B, the touch controller 123 of the touch sensor array 122 transmits touch data associated with touches on touch sensor array 122 to the intermediate controller in the touch sensing mode, but does not transmit touch data to the intermediate controller in the fingerprint sensing mode. An intermediate controller may be advantageously utilized, for example, to implement a combined touchpad utilizing a touch sensor having a controller that is not configured to receive touch data obtained from fingerprint sensor that is separate from the touch sensor array.

The touch data associated with the touch received at the fingerprint sensor that is transmitted to the second controller at 312 may be touch location data such as, for example, the x and y coordinates of the touch. The x and y coordinates may be determined by the fingerprint controller and may be determined as the point that is at the center, or near the center, of a touch area, or the touch image, of the touch received at the fingerprint sensor. As described in more detail below, the x and y coordinates of the touch location data may be determined with respect to a fingerprint sensor coordinate system.

At 314, the second controller determines a touch location of the touch on the combined touchpad. Determining the touch location on the combined touchpad may include translating the touch data transmitted to the second controller, such as touch location data in the coordinate system of the fingerprint sensor, to the coordinate system of the combined touchpad. As noted above, the resolution of the fingerprint sensor may be greater than the resolution of the touch sensor array. Therefore, in some cases, determining the touch location on the combined touchpad may further include accounting for this difference in resolution by, for example, multiplying the coordinates of the touch in the fingerprint sensor coordinate system by a scaling factor such that the units match the units utilized in the combined touchpad coordinate system.

Figure 4:
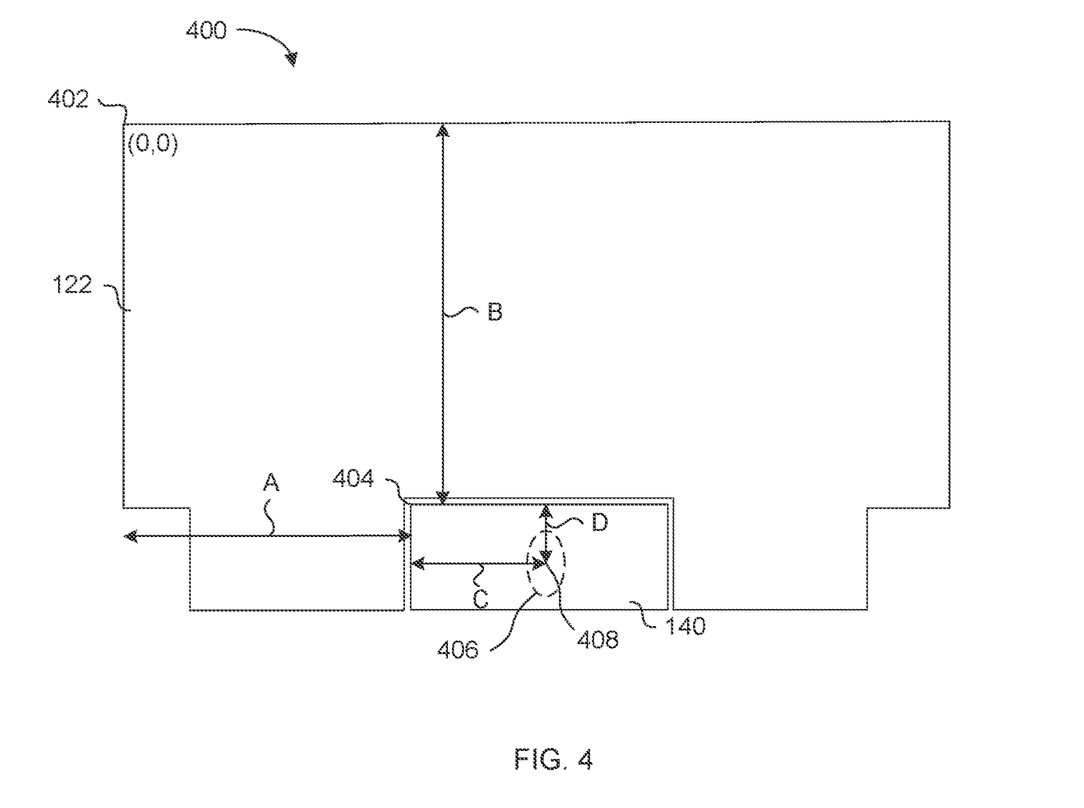
FIG. 4 illustrates an example of detecting a touch in accordance with the disclosure.

Referring now to FIG. 4, an example of determining a touch location on a combined touchpad 400 is shown. The combined touchpad 400 is formed by touch sensors 122 of the keyboard 120 and the fingerprint sensor 140, as shown in FIG. 2B.

The touch locations on the combined touchpad 400 are described by x and y coordinates, which give the horizontal and vertical distances, respectively, relative to an origin point 402. In the example shown in FIG. 4, the origin point 402 is the top left corner of the combined touchpad, which is also the top left corner of the touch sensors 114. However, the original may be any point on the combined touchpad 400. The fingerprint sensor 140 may have its own coordinate system relative to a fingerprint original point 402. Thus, touch locations of touches on the fingerprint sensor are described by x and y coordinates relative to a fingerprint origin point 404. The fingerprint sensor coordinate system in the example shown in FIG. 4 is offset in the x direction by distance A and offset in the y direction by distance B. Thus, the fingerprint origin point 404, which has coordinates (0,0) in the fingerprint coordinate system, has coordinates (A,B) in the combined touchpad coordinate system.

In the example shown in FIG. 4, a touch having a touch area 406 is received at the fingerprint sensor 140. All of the detected touch points in the touch area 406 may form the fingerprint data associated with the touch. In the fingerprint sensing mode, this fingerprint data may be compared to stored fingerprint data to determine authentication of the user. In a touch sensing mode, a touch location 408 of the touch may be determined as the center, or a point near the center, of the touch area 406. The touch location 408 is at coordinate (C,D) in the fingerprint sensor coordinate system, i.e., the touch location is a distance C in the x direction and a distance D in the y direction from the origin point 404. The coordinates (C,D) of the touch location 408 may be referred to as the touch location data of the touch.

Therefore, in the example shown in FIG. 4, the location of the touch in the combined touchpad coordinate system may be determined by adding the coordinates of the touch point 408 in the fingerprint coordinate system, (C,D), with the coordinates of the origin point 404 in the combined touchpad coordinate system, (A,B). Thus, the coordinates of the touch location 408 in the combined touchpad coordinate system is ((A+C), (B+D)).

As noted above, due to a difference in resolution between the fingerprint sensor 140 and the touch sensor array 122, the coordinates of the touch in the fingerprint sensing coordinate system may need to be scaled in order to match the distance units of the combined touchpad coordinate system. For example, for a capacitive fingerprint sensor and touch sensor array, the distance units of the respective coordinate systems may be, for example, the distance between adjacent touch sensors. If, for example, the density of touch sensors in the fingerprint sensor 140 is a factor of ten times the density of touch sensors in the touch sensor array 122, then the coordinates of touch point 408 location data in the fingerprint sensor coordinate system may be scaled by a factor of 0.1 before being added to the origin point 404 in the combined touchpad coordinate system such that the units of distance for the two coordinate points match.

Referring to the flow chart shown in FIG. 3, the touch location data in the fingerprint sensor coordinate system of the touch location 408, i.e., (C,D) in the example shown in FIG. 4, may be determined by the fingerprint controller, then transmitted to the second controller at 312. The second controller may then translate the touch location data, (C,D), of the touch location 408 in the fingerprint sensor coordinate system to the combined touchpad coordinate system as described above, which is ((A+C), (B+D)).

Advantageously, a fingerprint sensor and touch sensors may form a combined touchpad. In a touch sensing mode, the touch data associated with a touch received on the fingerprint sensor may be sent to a touch controller, such as the touch controller of the touch sensors, whereas in a fingerprint sensing mode the touch data associated with a touch received on the fingerprint sensor is not sent to the touch controller, but is sent to a fingerprint sensor only. In some examples, the controller utilized to determine touch locations in the touch sensing mode is an intermediate controller that is different from the controllers utilized to determine touch data from the fingerprint sensor and the touch sensors in the fingerprint mode.

The scope of the claims should not be limited by the preferred embodiments set forth in the examples, but should be given the broadest interpretation consistent with the description as a whole.

What is claimed is:

1. A method for controlling an electronic device having a first touch sensor array and a fingerprint sensor, the method comprising:
   receiving a first touch at the fingerprint sensor;
   receiving a trigger at the fingerprint controller from an application on the electronic device that indicates whether authentication is required by the application, in response to the trigger indicating that authentication is required by the application, initiating a fingerprint sensing mode, and in response to the trigger indicating that authentication is not required by the application, initiating a touch sensing mode;
   in the fingerprint sensing mode:
     receiving first touch data associated with the first touch at a fingerprint controller; and
     authenticating a user based on the first touch data; and
   in the touch sensing mode:
     transmitting the first touch data associated with the first touch to a second controller, wherein the fingerprint sensor is a separate touch sensor from the first touch sensor array and wherein the fingerprint sensor and the first touch sensor array are arranged side by side to form a combined touchpad having a touch area larger than touch areas of each of the first touch sensor array and the fingerprint sensor in the touch sensing mode; and
     determining a touch location on the combined touchpad based on the first touch data associated with the first touch received at the fingerprint sensor.

2. The method of claim 1, wherein the first touch sensor array is a capacitive touch sensor array incorporated into a keyboard of the electronic device.

3. The method of claim 2, wherein the second controller is a keyboard controller configured to detect touches received on the first touch sensor array.

4. The method of claim 1, further comprising:
   receiving a second touch at the first touch sensor array;
   in the touch sensing mode, transmitting second touch data associated with the second touch to the second controller, wherein the second controller is an intermediate controller; and
   in the fingerprint sensing mode, transmitting the second touch data associated with the second touch to a third controller, wherein the third controller is a controller of the first touch sensor array.

5. The method of claim 1, wherein in the touch sensing mode, first touch data associated with the first touch at the fingerprint sensor is transmitted by the fingerprint controller to the second controller.

6. The method of claim 1, further comprising, in response to authenticating the user based on the first touch data, transmitting to an application executed on the electronic device an indication that the user is authenticated.

7. The method of claim 6, wherein transmitting the indication comprises refraining from transmitting the first touch data associated with the first touch received on the fingerprint sensor to the application.

8. An electronic device comprising:
   a fingerprint sensor;
   a first touch sensor array, wherein the fingerprint sensor is a separate touch sensor from the first touch sensor array and wherein the first touch sensor array and the fingerprint sensor are arranged side by side to form a combined touchpad having a touch area larger than touch areas of each of the first touch sensor array and the fingerprint sensor in a touch sensing mode;
   a fingerprint controller coupled to the fingerprint sensor, the fingerprint controller configured to:
     receive a trigger from an application on the electronic device that indicates whether authentication is required by the application;
     in response to an indication that authentication is required by the application, initiate a fingerprint sensing mode; and
     in response to an indication that authentication is not required by the application, initiate a touch sensing mode
   a second controller that is different from the fingerprint controller, the second controller coupled to the fingerprint controller and the touch sensor array;
   wherein the fingerprint sensor is configured to:
     receive first touch data associated with a first touch at the fingerprint sensor;
     in the fingerprint sensing mode, authenticate a user based on the first touch data; and
     in the touch sensing mode, transmit the first touch data associated with the first touch to the second controller; and
   wherein the second controller is configured to, in a touch sensing mode:
     receive the first touch data associated with the first touch at the fingerprint sensor; and
     determine a touch location on the combined touchpad based on the first touch data associated with the first touch received at the fingerprint sensor.

9. The electronic device of claim 8, wherein the first touch sensor array is a capacitive touch sensor array incorporated into a keyboard of the electronic device.

10. The electronic device of claim 9, wherein the second controller is a keyboard controller configured to detect touches received on the first touch sensor.

11. The electronic device of claim 8, wherein the electronic device further comprises:
    a third controller that is a controller of the first touch sensor array and is configured to, in a fingerprint sensing mode, receive second touch data associated with a second touch received at the first touch sensor array; and
    wherein the second controller is an intermediate controller and is configured to receive the second touch data in the touch sensing mode.

12. The electronic device of claim 8, wherein the fingerprint controller is further configured to transmit to an application executed on the electronic device an indication that the user is authenticated in response to authenticating the user based on the first touch data.

13. The electronic device of claim 12, wherein transmitting the indication comprises refraining from sending the touch data associated with the touch received on the fingerprint sensor to the application.

14. A method for controlling an electronic device having a fingerprint sensor, the method comprising:
    associating a first location on the fingerprint sensor with a first action and associating a second location on the fingerprint sensor with a second action that is different than the first action;

receiving a touch at a touch location on the fingerprint sensor;

in a fingerprint sensing mode:

authenticating a user based on the first touch;

determining that the touch location corresponds to one of the first location and the second location;

after authenticating the user and in response to determining that the touch location corresponds to the first location, performing the first action, and after authenticating the user and in response to determining that the touch location corresponds to the second location, performing the second action that is different than the first action, wherein the first action is a first one of launching an application or opening a feature, and the second action is a second one of launching an application or opening a feature different from the first one.

15. The method of claim 14, wherein performing the one of the first action and the second action comprises one of launching an application and launching a feature.

* * * * *